United States Patent
Rolew et al.

(10) Patent No.: US 9,500,465 B2
(45) Date of Patent: Nov. 22, 2016

(54) METHOD AND DEVICE FOR DETERMINING A RECOGNITION THRESHOLD

(75) Inventors: Eduard Rolew, Leonberg (DE); Verena Schmidt, Erbendorf (DE); Bernhard Opitz, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 592 days.

(21) Appl. No.: 13/976,566

(22) PCT Filed: Oct. 31, 2011

(86) PCT No.: PCT/EP2011/069148
§ 371 (c)(1),
(2), (4) Date: Sep. 19, 2013

(87) PCT Pub. No.: WO2012/089366
PCT Pub. Date: Jul. 5, 2012

(65) Prior Publication Data
US 2014/0019084 A1 Jan. 16, 2014

(30) Foreign Application Priority Data
Dec. 27, 2010 (DE) .................. 10 2010 064 203

(51) Int. Cl.
*G01B 7/14* (2006.01)
*G01D 5/14* (2006.01)

(52) U.S. Cl.
CPC .............. *G01B 7/14* (2013.01); *G01D 5/145* (2013.01)

(58) Field of Classification Search
None
See application file for complete search history.

(56) References Cited

U.S. PATENT DOCUMENTS

| 5,497,084 A | 3/1996 | Bicking | |
| 7,882,394 B2 * | 2/2011 | Hosek | G05B 23/0235 702/184 |
| 2011/0270553 A1 * | 11/2011 | Ausserlechner | G01R 15/202 702/64 |

FOREIGN PATENT DOCUMENTS

| CN | 1683757 A | 10/2005 |
| DE | 36 38 622 | 1/1992 |

(Continued)

OTHER PUBLICATIONS

International Search Report, PCT International Application No. PCT/EP2011/069148, dated Mar. 19, 2012.

*Primary Examiner* — Aditya Bhat
(74) *Attorney, Agent, or Firm* — Norton Rose Fulbright US LLP; Gerard Messina

(57) ABSTRACT

A method for determining a recognition threshold for recognizing the presence of a tooth or a tooth gap of a position sensor in front of a sensor is presented. The method includes a step of reading in a sensor signal which represents a variation over time of a measured magnetic field when the teeth and the tooth gaps of the position sensor are passed by the sensor. In addition, the method includes a step of ascertaining from the sensor signal a first value based on a minimum value of the sensor signal and a first value based on a maximum value of the sensor signal within a predefined time interval. The method also includes a step of computing a differential absolute value which represents a predetermined percentage of a difference between the value based on the at least one maximum value and a value based on the at least one minimum value of the sensor signal. Lastly, the method includes a step of determining the recognition threshold, so that the recognition threshold represents a value that corresponds to a result of adding the differential (Continued)

absolute value to the first value based on the minimum value of the sensor signal.

8 Claims, 5 Drawing Sheets

(56) References Cited

FOREIGN PATENT DOCUMENTS

| | | |
|---|---|---|
| DE | 101 54 155 | 5/2003 |
| GB | 2 357 849 | 7/2001 |
| JP | H1020973 | 1/1998 |
| JP | H10254549 | 9/1998 |
| JP | H1188689 | 3/1999 |
| JP | 2002504672 | 2/2002 |
| JP | 2007324911 | 12/2007 |

* cited by examiner

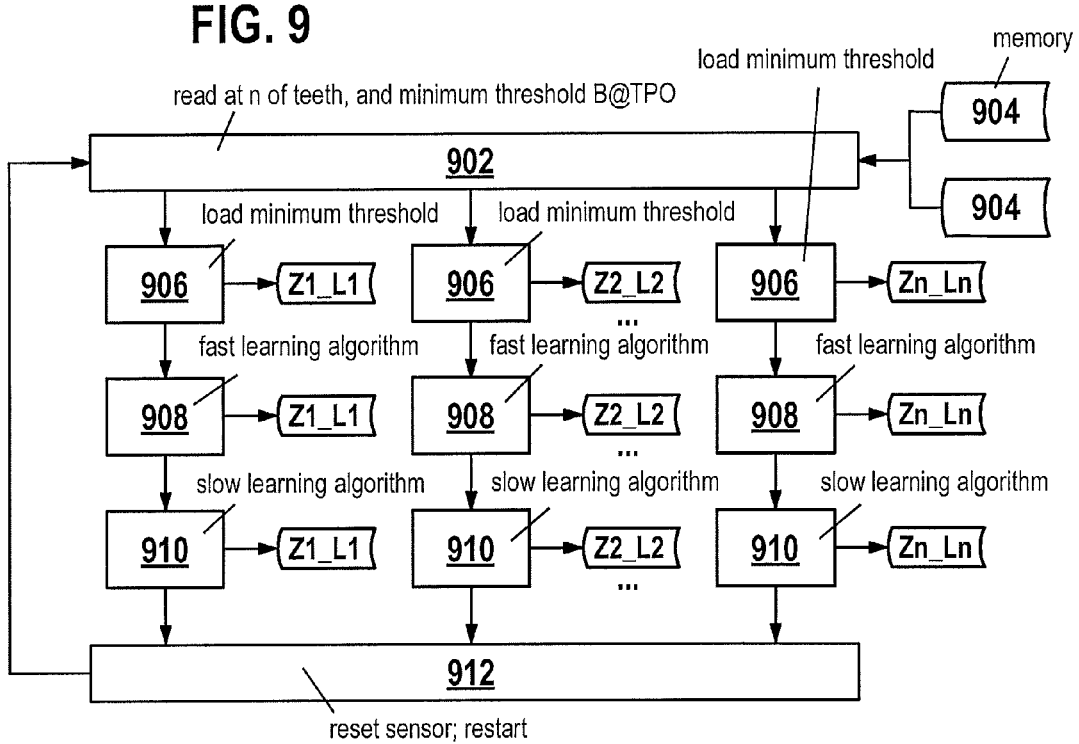
FIG. 9
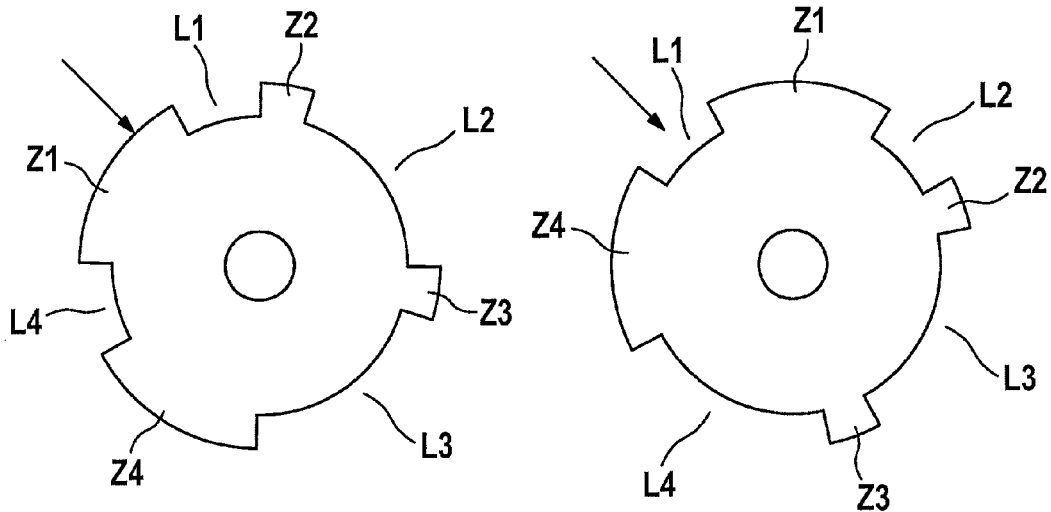
FIG. 10
FIG. 11

METHOD AND DEVICE FOR DETERMINING A RECOGNITION THRESHOLD

CROSS-REFERENCE TO RELATED APPLICATIONS

The present application is a national phase of International Patent Application No. PCT/EP2011/069148 filed on Oct. 31, 2011, which claims priority under 35 U.S.C. §119 of German Patent Application No. 10 2010 064 203.7 filed on Dec. 27, 2010, the content of all of which are hereby incorporated by reference in their entireties.

FIELD

The present invention relates to a method and a computer program for determining a recognition threshold, a device for determining a recognition threshold.

BACKGROUND INFORMATION

A conventional phase sensor detects the geometry of a sensor wheel. For this purpose, a signal is evaluated which represents a magnetic variable that is recorded by the sensor when a tooth is passed by the sensor. The sensor recognizes that the tooth has passed by, and "switches," i.e., recognizes this passing by when a predefined portion of a signal amplitude is exceeded in the magnetic signal detected by the sensor. Since the signal amplitude, and therefore the switching level, changes as a function of temperature, the air gap, or aging, the switching threshold must be continually readjusted during operation. Present sensors use a preprogrammed switching threshold during switch-on which ensures over all operating states that the sensor recognizes the tooth and the gap during switch-on. This allows the so-called "true power-on" function, in which the sensor recognizes during switch-on whether it is situated in front of a tooth or a gap. The sensor subsequently learns or trains the optimal switching threshold for recognizing a tooth-gap pair as a function of the instantaneously present magnetic signal amplitude.

German Patent No. DE 36 38 622 C2 describes a phase sensor which builds up its own magnetic field via a magnet and registers changes in the magnetic field.

SUMMARY

In accordance with the present invention, a method is provided for determining a recognition threshold, a device is provided for determining a recognition threshold, and lastly, a corresponding computer program product is provided according to the main claims. Advantageous embodiments result from the respective subclaims and the following description.

The present invention provides an example method for determining a first and a second recognition threshold for recognizing the presence of teeth or tooth gaps of a position sensor in front of a sensor, the method including:

reading in a sensor signal which represents a variation over time of a measured magnetic field when the teeth and the tooth gaps of the position sensor are passed by the sensor;

ascertaining from the sensor signal a first value based on a minimum value of the sensor signal and a first value based on a maximum value of the sensor signal within a predefined time interval;

computing a differential absolute value which represents a predetermined percentage of a difference between the first value based on the at least one maximum value and the first value based on the at least one minimum value of the sensor signal;

determining the first recognition threshold, so that the first recognition threshold represents a value that corresponds to a result of adding the differential absolute value to the first value based on the minimum value of the sensor signal;

ascertaining from the sensor signal a second value based on a minimum value of the sensor signal and a second value based on a maximum value of the sensor signal within a second predefined time interval subsequent to the predefined time interval;

computing a second differential absolute value which represents a second predetermined percentage of a difference between the second value based on the maximum value and the second value based on the minimum value of the sensor signal; and determining the second recognition threshold, which is different from the first recognition threshold, so that the second recognition threshold represents a value that corresponds to a result of adding the second differential absolute value to the second value based on the minimum value of the sensor signal.

Moreover, the present invention provides an example device for determining a first and a second recognition threshold for recognizing the presence of teeth or tooth gaps of a position sensor in front of a sensor, the device having the following features:

an interface for reading in a sensor signal which represents a variation over time of a measured magnetic field when the teeth and the tooth gaps of the position sensor are passed by the sensor;

a unit for ascertaining from the sensor signal a first value based on a minimum value of the sensor signal and a first value based on a maximum value of the sensor signal within a predefined time interval, and for ascertaining from the sensor signal a second value based on a minimum value of the sensor signal and a second value based on a maximum value of the sensor signal within a second predefined time interval subsequent to the predefined time interval;

a unit for computing a differential absolute value which represents a predetermined percentage of a difference between the first value based on the at least one maximum value and a first value based on the at least one minimum value of the sensor signal, and for computing a second differential absolute value which represents a second predetermined percentage of a difference between the second value based on the maximum value and the second value based on the minimum value of the sensor signal; and a unit for determining the first recognition threshold, so that the first recognition threshold represents a value that corresponds to a result of adding the differential absolute value to the value based on the minimum value of the sensor signal, and for determining the second recognition threshold, which is different from the first recognition threshold, so that the second recognition threshold represents a value that corresponds to a result of adding the second differential absolute value to the second value based on the minimum value of the sensor signal.

Thus, the example device is designed to carry out or implement the steps of the example method according to the present invention. In particular, the device may have units which are each designed to carry out one step of the method. In addition, as a result of this design variant of the present invention in the form of a device, the object of the present invention may be achieved quickly and efficiently.

In the present context, a device may be understood to mean an electrical or electronic device which processes sensor signals and outputs control signals as a function of same. The device may have an interface which may be provided by hardware and/or software. In a hardware design, the interfaces may be, for example, part of a so-called system ASIC which contains various functions of the device. However, it is also possible for the interfaces to be dedicated, integrated circuits or to be composed, at least partially, of discrete components. In a software design, the interfaces may be software modules which are present in addition to other software modules on a microcontroller, for example.

Also advantageous is a computer program product having example program code which is stored, for example, on a machine-readable carrier such as a semiconductor memory, a hard drive memory, or an optical memory and used for carrying out the method according to one of the above-described specific embodiments when the program is executed on a control unit or a device.

According to the approach described here, a position sensor may be a component having features such as teeth or cams which are able to influence, for example, a magnetic field that is present or formed in the immediate vicinity due to a change of their location, i.e., due to the change in elements having ferromagnetic properties. Likewise, a position sensor may have permanent magnetic properties over its extent which impress a magnetic field, which is movable together with the position sensor, on a surroundings of the position sensor. A position sensor may be understood to mean a toothed rack or a sensor wheel, for example. A sensor wheel may be a rotatably mounted disk having recesses on an edge of the sensor wheel, and a toothed rack may have the recesses over a direction of extension of the toothed rack. If the sensor wheel has permanent magnetic properties, it may impress a magnetic field which rotates with the sensor wheel, and which is changeable at certain positions, depending on the angle of the recesses or the teeth. The sensor wheel may be fixedly connected to an axis whose rotational motion is to be monitored. If the toothed rack has permanent magnetic properties, the toothed rack may impress a magnetic field which is movable with the toothed rack. A change in the magnetic field may be recorded by a magnetic field sensor, for example a Hall sensor, and converted into an electrical signal. The magnetic field sensor may be designed to generate its own magnetic field. A change in a relationship of the magnetic field to a ferromagnetic object, such as the sensor wheel or the toothed rack, may be registered by the sensor. Likewise, a sensor wheel having permanent magnetic properties may be detected by a sensor without a magnet. In addition, a ferromagnetic sensor wheel and a sensor having integrated magnets or a magnetized sensor wheel (so-called multipole sensor wheel) which is measured using a sensor without a magnet may be used.

The magnetic field sensor may be fixedly mounted relative to the sensor wheel or the toothed rack. Likewise, the magnetic field sensor may be rotatably or movably mounted. In that case, the sensor wheel may be a stationary sensor ring.

A signal of the sensor, or sensor signal, represents a change in the magnetic field due to a relative motion between the sensor and an element of the position sensor. A motion may be a distance covered over a certain period of time. Thus, the sensor signal may represent a variation of the magnetic field over time. The "value based on a minimum value" may be a minimum value basis for computation which is used as the basis for computation in subsequent steps, and which has been determined using a minimum value in the stated time interval. This minimum value basis for computation may be, for example, an individual minimum value that has appeared in the mentioned time interval, or, for example, a minimum value averaged over multiple cycles, the averaging being carried out using minimum values that appear at certain points in time or in certain time intervals. A range around a signal edge to be expected in the sensor signal may be understood as a predetermined time interval. For example, this time interval may extend from a few microseconds to a few milliseconds. The "value based on a maximum value" may likewise be a maximum value basis for computation which is used as the basis for computation in subsequent steps, and which has been determined using a maximum value in the stated time interval. This maximum value basis for computation may be, for example, an individual maximum value that has appeared in the mentioned time interval, or a maximum value averaged over multiple cycles, the averaging being carried out using maximum values that appear at certain points in time or in certain time intervals. Furthermore, the differential absolute value may be a value that results when the difference between the value based on the maximum value and the value based on the minimum value of the sensor signal is multiplied by a certain percentage. This differential absolute value represents a value which is added, for example, to the value based on the minimum value in order to obtain the recognition threshold. Thus, a value is determined for the recognition threshold which is increased by a certain percentage of the difference between the value based on the maximum value and the value based on the minimum value.

In accordance with an example embodiment of the present invention, a size of an air gap between a sensor and characteristics to be sensed influences a signal level. If the air gap extends nonuniformly along a scanning path, the resulting signal has fluctuations. For example, runouts at a position sensor or sensor wheel result in fluctuations in a signal brought about by teeth on the sensor wheel as a position sensor. Likewise, teeth may be situated, for example, on a linear sensor unit as a position sensor. Teeth of different height may then result in fluctuations in signal strength. Since the signal between the teeth and the gaps in-between does not have an infinite slope, this results in a position error during a detection on a fixed level or a fixed signal strength. In the case of the sensor wheel as a position sensor, the runout results in an angle error in the signal, and in the case of the linear unit as a position sensor, results in a linear position error. It is therefore advantageous to detect the passing of the tooth by the sensor at each tooth at the optimal point i.e., the level of the associated sensor signal. For this purpose, for example for each tooth an individual value may be ascertained as the threshold (referred to here as the recognition threshold), in which the passing of a certain tooth by the sensor is recognized. In the signal, this measuring point or threshold value usually has the lowest scattering in the sensor signal over multiple measuring series/passes or revolutions, and is therefore best suited for a measurement. In order to measure the individual height of a tooth based on the signal of the sensor, the signal level which is associated with one of the preceding and/or subsequent gaps, and in relation thereto, the signal level of the tooth, may be detected. At any tooth, the most advantageous point for measuring may be the same ratio of a signal that represents a tooth root to a signal that represents a tooth tip. Values having different absolute values may be determined for the recognition threshold for the individual tooth-gap or gap-tooth pairs, it being ensured by the selection of the predetermined percentage that, for the particular pairs, a recognition threshold is used which has the smallest possible fluctuation range. In particular, for different mentioned pairs, the same predetermined percentage may be selected which has been characterized as a value at which the sensor signal has a small fluctuation range. In particular, in accordance with the present invention the number of teeth may be known, so that different recognition thresholds may be determined for different teeth of the position sensor. It may thus be ensured that different teeth may be recognized very precisely using different recognition thresholds. It is thus possible to also ascertain very accurately the presence of a tooth or a gap in front of the sensor, the knowledge of the number of teeth of the position sensor allowing the particular recognition threshold or switching threshold to be used to be selected from the various switching thresholds based on which the tooth to be expected is determined.

The present invention may offer the advantage that different sensor signal segments which represent the passing of different teeth and/or gaps in front of the sensor or represent corresponding distances of these teeth or gaps from the sensor result in different recognition thresholds. In subsequent operation of the sensor, this advantageously allows these individual different recognition thresholds to be used for recognizing different teeth, high recognition precision being possible.

It may also be advantageous if, in the step of computing the second differential absolute value as the second predetermined percentage, a value is used which corresponds to the predetermined percentage that is used in the step of computing the differential absolute value. Such a specific embodiment of the present invention offers the advantage of very simple implementability, since only a single certain percentage needs to be used for determining the particular differential absolute value. At the same time, this certain percentage may also be optimized with respect to values based on experience, at which location the signal curve between the minimum value and the maximum value (or between the averaged minimum value and the averaged maximum value) has the smallest fluctuation range in the predetermined time interval.

To ensure that the method presented above allows only a recognition threshold which is actually usable, and which does not result in a determination of a recognition threshold even for very small signal fluctuations (caused by measuring errors, for example), in the first ascertainment step the first value based on the minimum value of the sensor signal and/or the first value based on the maximum value of the sensor signal may be discarded, and/or in the second ascertainment step the second value based on the minimum value and/or the second value based on the maximum value may be discarded, if a difference between the first value based on the minimum value and the first value based on the maximum value and/or a difference between the second value based on the minimum value and the second value based on the maximum value is/are less than a predetermined differential threshold value.

The method is particularly robust if, prior to determining the recognition threshold, the minimum values are averaged and maximum values of the signal curve are averaged in time windows which affect a specific tooth of the position sensor. For this purpose, the number n of teeth of the position sensor should be known. In the signal curve, a pattern is then obtained from successive high values (which represent the individual teeth) and low values in between (which represent the gaps). The averaging may then be carried out in such a way that in the signal curve, the value based on the minimum value is obtained by averaging the minimum values of each nth group of low values, and the value based on the maximum value is obtained by averaging the maximum values of each nth group of low values. If a position sensor having a number of n teeth is used in combination with the sensor, it is therefore advantageous if, in the reading-in step, a sensor signal having a plurality of groups of small values and a plurality of groups of large values is read in, and in the ascertainment step, the value based on a minimum value of the sensor signal is obtained by averaging the minimum values of each nth group of small values, and the value based on a maximum value of the sensor signal is obtained by averaging the maximum values of each nth group of large values.

To allow very precise determination of the position of the tooth of the position sensor, the example method described herein may also use the previously determined first and/or second recognition threshold. An adaptive sensor system may thus be implemented which on the one hand has an option for determining the optimal recognition threshold (in contrast to a recognition threshold preset at the factory), and on the other hand an option for adapting the recognition threshold, which allows readjustment of the recognition threshold in the event of aging or wear, for example. For this purpose, the method may thus also have a step of detecting a tooth of the position sensor when the sensor signal has a value that is greater than the first recognition threshold or the second recognition threshold.

To allow fast learning, i.e., recognition of teeth of the position sensor in real time for a switch-on operation of the sensor, in which a previously determined recognition threshold may not yet be present, the recognition of teeth may be carried out, for example, based on a uniform initial threshold value which is the same for all teeth. For this purpose, the method may have, prior to the ascertainment step, a step of detecting a tooth of the position sensor, the tooth of the position sensor being detected when the sensor signal has a value that is larger than an initial threshold value.

BRIEF DESCRIPTION OF THE DRAWINGS

The present invention is explained in greater detail below as an example, with reference to the figures.

FIG. 9 shows a flow chart of another method for determining a position of teeth and/or tooth gaps of a position sensor according to one exemplary embodiment of the present invention.

FIG. 10 shows a sensor wheel for influencing a magnetic field as a function of a rotation angle, having a numbering of teeth, according to one exemplary embodiment of the present invention.

FIG. 11 shows the sensor wheel according to FIG. 10, having a different numbering of teeth, according to one exemplary embodiment of the present invention.

DETAILED DESCRIPTION OF EXAMPLE EMBODIMENTS

Figure 1:
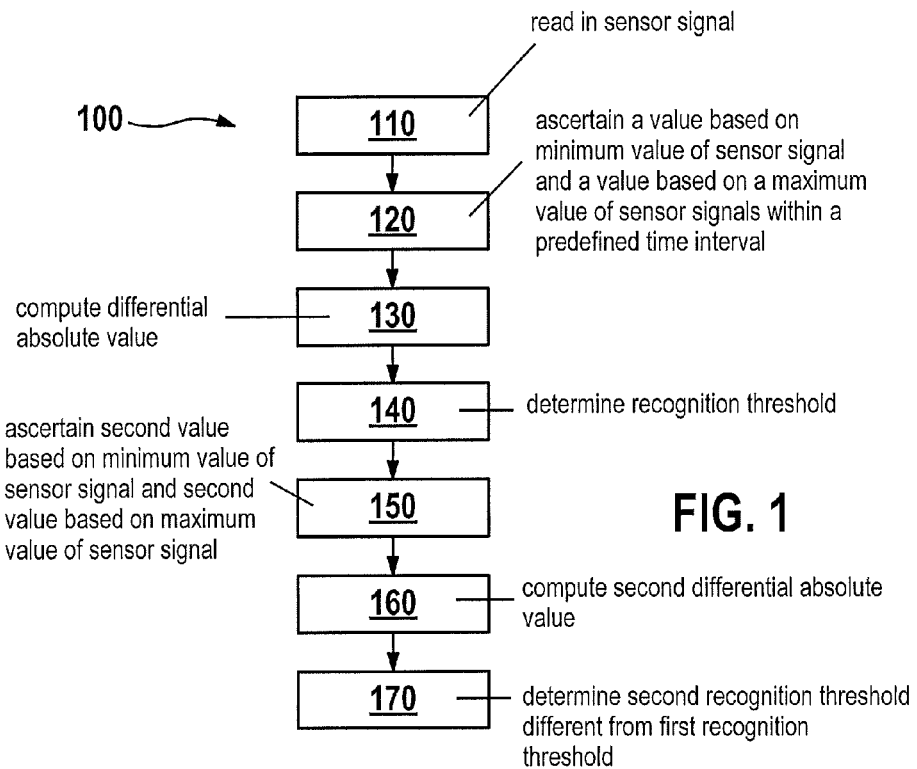
FIG. 1 shows a flow chart of a method according to one exemplary embodiment of the present invention.

Identical or similar elements may be denoted by identical or similar reference numerals in the figures, and therefore the description is not repeated. In addition, the figures and the description thereof contain numerous features in combination. These features may also be considered individually, or combined to form further combinations not explicitly described herein. Furthermore, the present invention is explained in the description below with the possible use of various measurements and dimensions; the present invention is not to be construed as being limited to these measurements and dimensions. Moreover, method steps according to the present invention may be carried out repeatedly, as well as in a sequence other than that described. An exemplary embodiment which includes an "and/or" conjunction between a first feature/step and a second feature/step may be construed in such a way that according to one specific embodiment, the exemplary embodiment includes the first feature/first step as well as the second feature/second step, and according to another specific embodiment includes only the first feature/step or only the second feature/step.

FIG. 1 shows a flow chart of a method 100 for determining a first and a second recognition threshold for recognizing the presence of teeth or tooth gaps of a position sensor in front of a sensor according to one exemplary embodiment of the present invention. The method has a reading-in step 110, an ascertainment step 120, a computation step 130, and a determination step 140. A sensor signal is read in in the reading-in step 110. The sensor signal represents, for example, a variation over time of a measured magnetic field. To obtain this signal, in a prior measuring step which does not necessarily have to be part of the method presented here, teeth and tooth gaps of a position sensor, in particular a sensor wheel or a toothed rack, are passed by a sensor. In ascertainment step 120, a value based on a minimum value of the sensor signal and a value based on a maximum value of the sensor signal are ascertained from the sensor signal within a predefined time interval. In computation step 130, a differential absolute value is computed which represents a predetermined percentage of a difference between the value based on the at least one maximum value and a value based on the at least one minimum value of the sensor signal. In determination step 140, the recognition threshold is determined in such a way that the recognition threshold represents a value that corresponds to a result of adding the differential absolute value to the value based on the minimum value of the sensor signal. These steps are advantageously repeated for all tooth-gap pairs and gap-tooth pairs. Thus, in particular a step 150 of ascertaining from the sensor signal a second value based on a minimum value of the sensor signal and a second value based on a maximum value of the sensor signal within a second predefined time interval subsequent to the predefined time interval is provided. A step 160 of computing a second differential absolute value is also provided which represents a second predetermined percentage of a difference between the second value based on the maximum value and the second value based on the minimum value of the sensor signal. Lastly, the method includes a step 170 of determining a second recognition threshold, which is different from the first recognition threshold, so that the second recognition threshold represents a value that corresponds to a result of adding the second differential absolute value to the second value based on the minimum value of the sensor signal.

Figure 7:
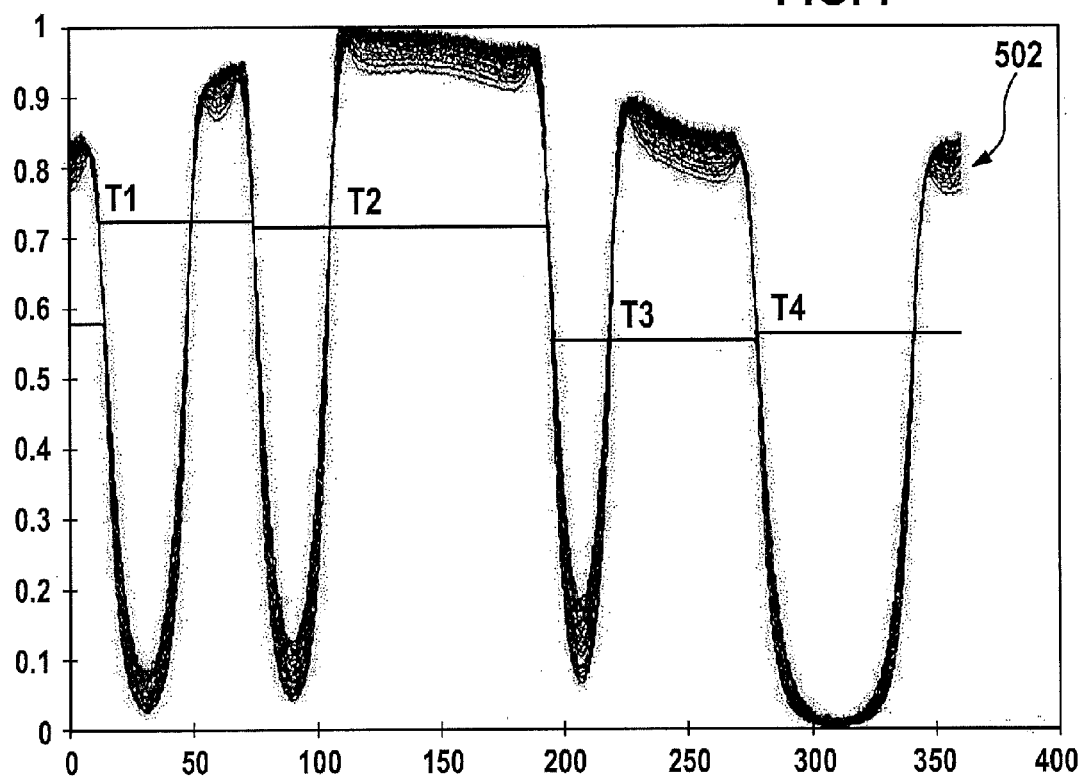
FIG. 7 shows an illustration of multiple magnetic field strength curves of a sensor signal recorded in cyclical repetition having an amplitude fluctuation as the function of a detection angle, and multiple optimized threshold values, which may be used for carrying out the present invention.

In other words, FIG. 1 shows an example of a flow chart of an evaluation algorithm or recognition threshold value determination algorithm, for example for phase sensors with sensor wheels having runouts. The runout of the sensor wheel or of a toothed rack, generally referred to as a position sensor, is taken into account, and therefore a more accurate switching characteristic is made possible. In this regard, "switching" is understood to mean that an evaluation of the sensor signal is carried out in such a way that it is recognized that the sensor signal is above or below a threshold value. The term "runout" refers to the different characteristic of teeth and gaps. The algorithm presented here stores, for example, a separate threshold value for each tooth-gap pair. For each tooth-gap pair, for example, a uniform switching threshold at x% of the particular tooth-gap amplitude (based on the signal level which represents a tooth or a gap) is then advantageously used. For this purpose, the number of teeth is stored in a memory. After power-on, the sensor starts with a B@TPO switching threshold as the initial threshold value. Upon startup it is not known which specific tooth or which specific gap is in front of the sensor. The B@TPO switching threshold is used as a starting switching threshold for all teeth. Since the starting point of the sensor wheel or of the toothed rack is unknown, the particular association of the teeth and gaps is redefined upon startup. The first valid maximum and minimum in each case, or the maximum and minimum, together form a pair. Thus, this may be a tooth-gap pair or a gap-tooth pair. The algorithm is now optimized in such a way that the defined switching threshold at x% of the amplitude does not apply to the entire sensor wheel revolution or toothed rack movement, but, rather, applies to a certain tooth-gap pair. For one tooth-gap pair in each case, the maximum and minimum are detected and the switching threshold for x% of the amplitude is computed. Thus, a different absolute switching point in mT is computed for each tooth-gap pair. For the 4-tooth sensor wheel illustrated in FIG. 10 and FIG. 11, as depicted in FIG. 7 four different switching thresholds T1 through T4 are computed, which in the present example each correspond to 70% of the amplitude of the particular tooth-gap pairs. In this way, the individual switching threshold also depicts the runout of a tooth. The two largest teeth Z1 and Z2 correspondingly have a higher absolute switching threshold.

Figure 2:
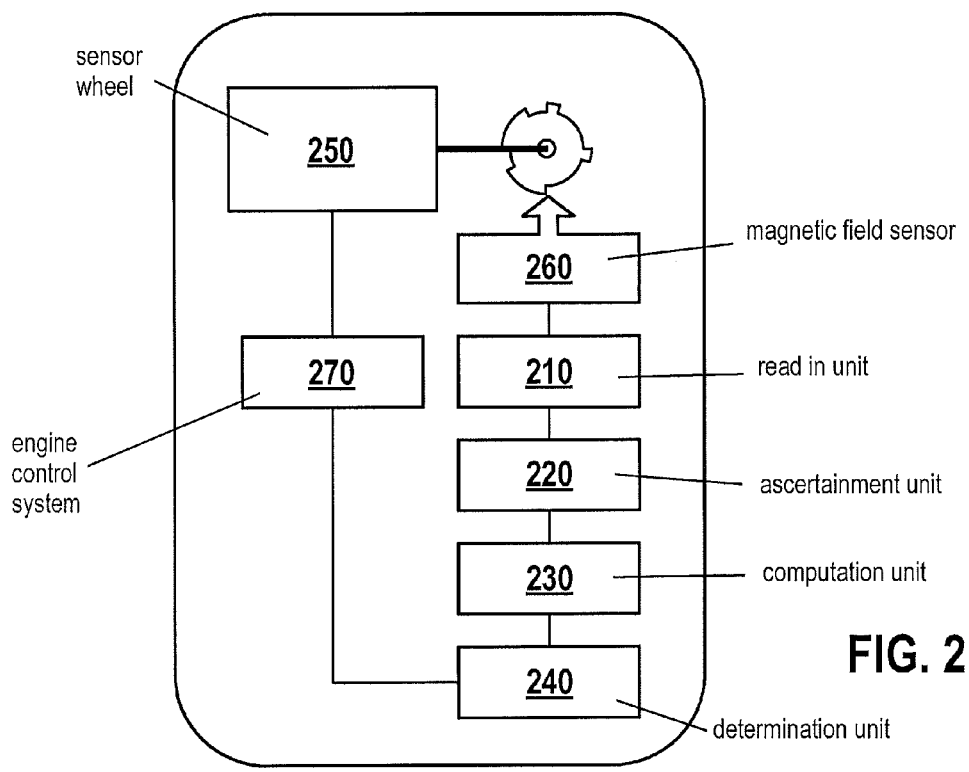
FIG. 2 shows a block diagram of a schematically illustrated vehicle having a device according to one exemplary embodiment of the present invention.

FIG. 2 shows a vehicle having a device for determining an instantaneous position of teeth and/or tooth gaps of a position sensor according to one exemplary embodiment of the present invention. The device has a read-in unit 210, an ascertainment unit 220, a computation unit 230, and a determination unit 240. The vehicle has an engine 250 having a flange-mounted sensor wheel, a magnetic field sensor 260, and an engine control system 270. The sensor wheel at engine 250 rotates with a rotational motion of an axis of engine 250. The teeth and the gaps on the sensor wheel change a magnetic field around magnetic field sensor 260. Magnetic field sensor 260 provides a signal which reflects this change in the magnetic field. Read-in unit 210 reads in this signal. Ascertainment unit 220 ascertains from the sensor signal a value based on a minimum value of the sensor signal and a value based on a maximum value of the sensor signal within a predefined time interval. In computing unit 230, a differential absolute value is computed which represents a predetermined percentage of a difference between the value based on the at least one maximum value and a value based on the at least one minimum value of the sensor signal. In determination unit 240, the recognition threshold is determined in such a way that the recognition threshold represents a value that corresponds to a result of adding the differential absolute value to the value based on the minimum value of the sensor signal. This operation is repeated for each tooth-gap pair and gap-tooth pair, for example.

Figure 3:
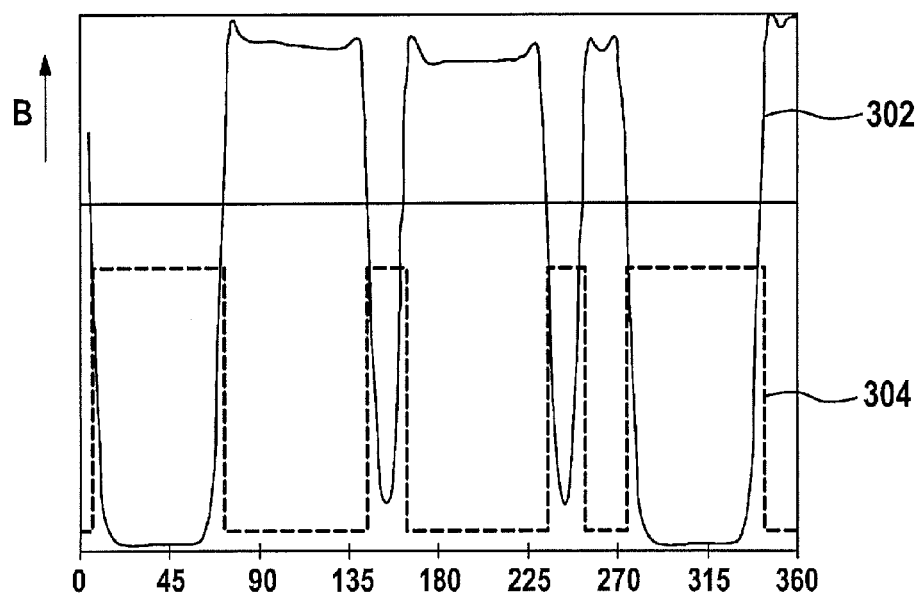
FIG. 3 shows an illustration of a magnetic field strength curve and a corresponding output signal curve as the function of a detection angle.

FIG. 3 shows a diagram of a signal curve 302 of a magnetic flux density as the function of a rotation angle. The rotation angle is plotted on the abscissa in degrees, and a dimensionless magnetic flux density B is plotted on the ordinate. In addition, the ordinate represents a signal level of an output signal 304, which corresponds to a value of the magnetic flux density which is above or below a threshold. Signal curve 302 of the flux density reflects a sequence of teeth and gaps of a sensor wheel as a function of the rotation angle of the sensor wheel, which is recorded by a magnetic field sensor.

The distance of the teeth or the gaps from the sensor influences the magnetic flux density at the sensor, and influences a detection of the sensor wheel geometry by a phase sensor. If the flux density exceeds a predefined switching threshold, for example 70% of a maximum value, output signal 304 changes its level. Thus, output signal 304 reflects the sequence of teeth and gaps on the sensor wheel as a function of the rotation angle ° CAM in binary form. The example illustrated in FIG. 3 operates with inverse logic; i.e., a tooth is output as a logical "0" and a gap is output as a logical "1."

Figure 4:
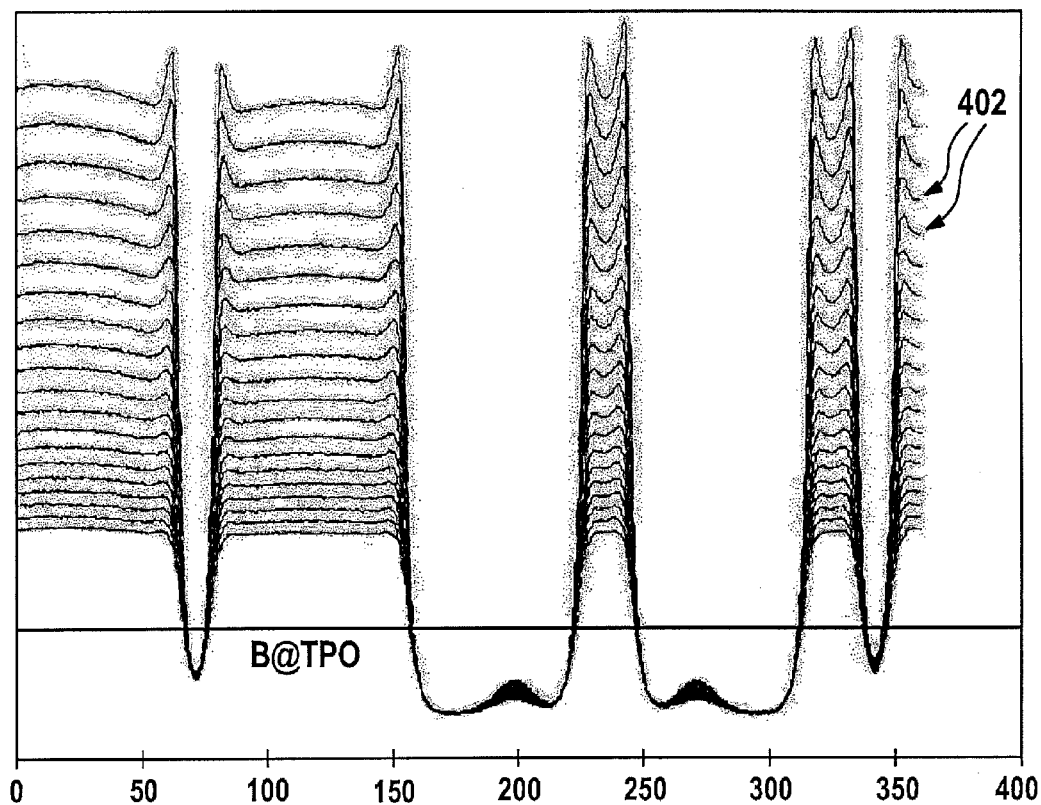
FIG. 4 shows an illustration of multiple magnetic field strength curves of a sensor signal recorded in cyclical repetition as the function of a detection angle, and a minimum threshold value, which may be used for carrying out the present invention.

FIG. 4 shows a diagram of multiple signal curves 402 of magnetic flux density or magnetic field characteristic curves as the function of a rotation angle. The rotation angle is plotted on the abscissa in degrees, and the magnetic flux density is plotted on the ordinate. Individual signal curves 402 have a similar curve since they represent the same teeth or tooth gaps; however, they have been recorded in different cycles during the revolution, i.e., at different points in time but at the same angular position. Changes in the flux density occur at the same angular positions, but vary in intensity. Each signal curve 402 represents a different measure for an air gap between teeth which change the magnetic field and spaces between a sensor wheel and a magnetic field sensor. The diagram shows a threshold value B@TPO which is higher than the lowest points on all curves 402 in all illustrated cases. The gaps between the teeth on the sensor wheel may thus be reliably recognized by comparing signal curves 402 to this (threshold) value.

Figure 5:
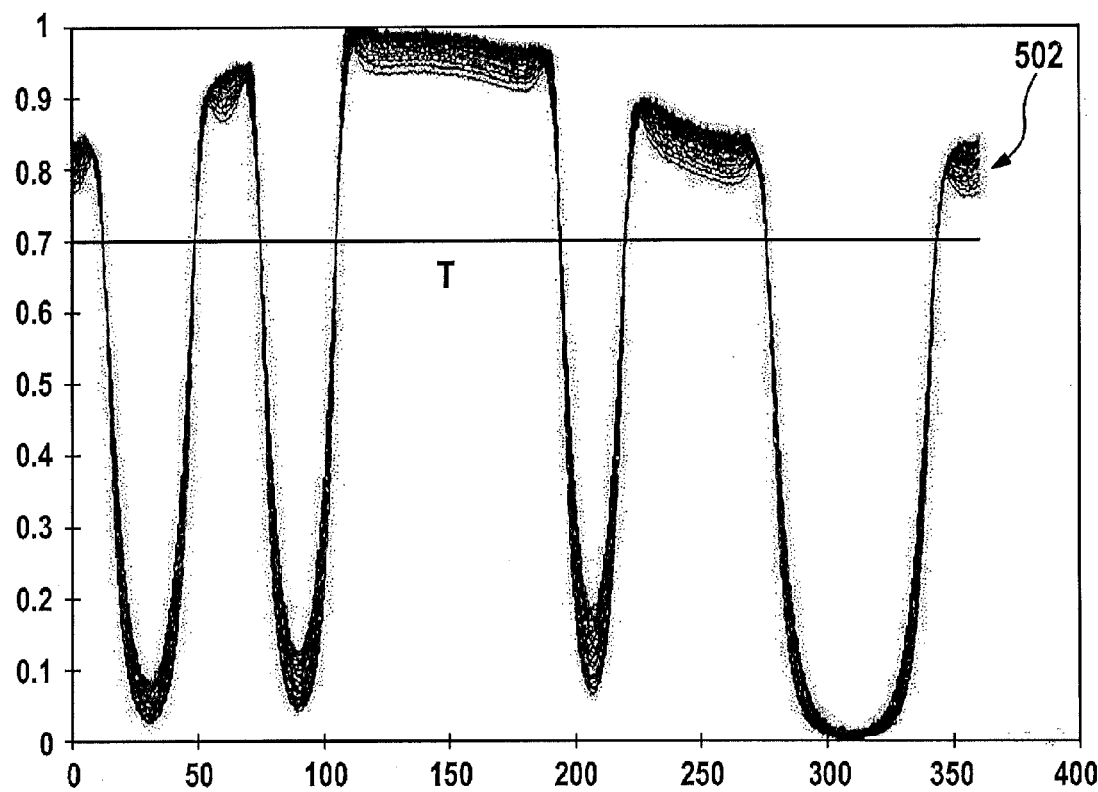
FIG. 5 shows an illustration of multiple magnetic field strength curves of a sensor signal recorded in cyclical repetition having an amplitude fluctuation as the function of a detection angle, and a uniform threshold value, which may be used for carrying out the present invention.

FIG. 5 shows a diagram of multiple signal curves 502 of magnetic flux density as a function of a rotation angle, having a uniform threshold T for all teeth. The rotation angle is plotted on the abscissa in degrees, and a dimensionless, normalized magnetic flux density is plotted on the ordinate. Signal curves 502 depict a magnetic field of a sensor wheel over one revolution. Teeth or cams on the sensor wheel are shown as the high signal level, and gaps are shown as the low signal level. The depiction shows the normalized signal curves for various air gaps. The high signal levels over an angular revolution of 360° have a variation of approximately 20%, based on the difference between a maximum high signal level and a minimum high signal level. Curves 502 have signal edges between the teeth and the gaps. A threshold value which is 70% of the maximum value is plotted in the diagram. An angle evaluation is carried out at this threshold value as the curve is passed through. Due to the steepness of the signal edges, an angle error results for a recognition between the teeth that are represented by a high signal level and teeth that are represented by a low signal level.

In the sensor wheel assessment, generally only an individual sensor wheel is checked. The runout may become degraded due to aging and manufacturing tolerances. Thus, in FIG. 5 the maximum of the signal for the largest tooth is achieved at 1 (normalized), while the signal for the smallest tooth is achieved at only 80% (normalized) of the maximum. As the result of using a uniform threshold (T) for all air gaps, for safety reasons a significantly lower switching threshold, for example 50% lower, must be used for a large runout. FIG. 5 shows such a signal when a sensor wheel is used. Use of the 70% switching threshold may be problematic if the least favorable tooth, having 80% of the normalized maximum signal amplitude at the time, becomes smaller due to further tolerances. If the tooth is below the threshold of 70% of the normalized maximum signal amplitude, part or all of the tooth is no longer recognized. In the future, phase sensors should be more robust with respect to runouts. This may be achieved, among other ways, by using sensor wheels having a higher tolerance. At the same time, the accuracy of the sensor should be maintained.

For each sensor wheel and optionally for each tooth-gap pair there is an optimal switching threshold of 70%, for example. The air gap dependency is lowest at this optimal switching threshold. In the present example, the switching threshold is optimally selected only for the largest tooth-gap pair, so that errors occur in the position determination for the other teeth, in particular if the air gap changes.

Figure 6:
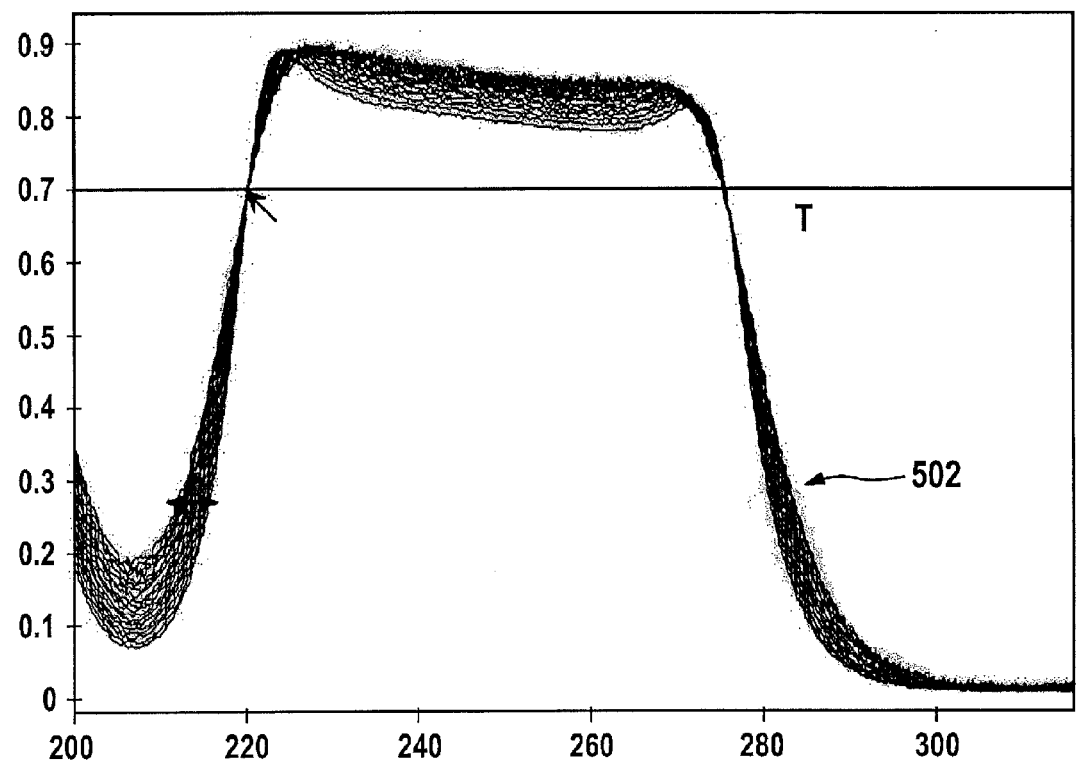
FIG. 6 shows an illustration of multiple magnetic field strength curves of a sensor signal recorded in cyclical repetition as the function of a detection angle range at a tooth, and an optimal threshold value for the tooth, which may be used for carrying out the present invention.

FIG. 6 shows the optimal height of the threshold value, using a signal curve for a tooth from FIG. 5 as an example. The set of signal curves has a scattering band that is wider in certain areas of the curve than in other areas. For example, the scattering band in the area around low levels is wider than in the area around higher levels, such as 70% of the normalized maximum signal amplitude. In the area around the highest levels of approximately 90% of the normalized maximum signal amplitude, the scattering band once again has a greater width. Therefore, in the present example it is advantageous to set the threshold value in the range around 70% of the normalized maximum signal amplitude. A minimum angle error results there compared, for example, to the range around 25% of the normalized maximum signal amplitude. This results in better reproducibility over various air gaps of the sensor wheel. However, the value of 70% of the normalized maximum signal amplitude may be different, depending on the scattering width. For this purpose, measurements of the scattering width of the sensor signal may be carried out, and the signal thresholds, described in greater detail below, may be set in such a way that the threshold is set at a value at which the scattering width of the sensor signal is minimal.

In other words, FIG. 6 shows a very small air gap dependency at the 70% switching threshold, and a high air gap dependency at the 25% switching threshold (in the area of the double arrow in FIG. 6). The threshold may be selected in such a way that the air gap dependency is minimized. The air gap dependency describes the shift of the switching point as a function of the air gap. Thus, for a threshold of 25% of the normalized maximum signal amplitude in FIG. 6, the air gap dependency is approximately 4° CAM, while the dependency at 70% of the normalized maximum signal amplitude is only 0.2° CAM. Use in the vehicle requires that the air gap dependency be minimized so that the switching edge remains the same when the air gap changes.

FIG. 7 shows an illustration of one application of an optimal threshold value for each tooth of the sensor wheel according to one exemplary embodiment of the present invention. Signal curves 502 correspond to the illustration in FIG. 5. In contrast to FIG. 5, each individual tooth has an optimized, different threshold value T1, T2, T3, and T4 as the switching threshold for the angle recognition. These threshold values may be computed, for example, in such a way that the scattering width of the sensor signal for recognizing a tooth and/or a gap according to the above discussion is minimal, in particular over the air gap. As a result, the switching threshold for a tooth having a fairly low signal level is lower than the switching threshold for a tooth having a high signal level. This results in a smaller angle error in recognizing the position of the individual teeth, and angle-dependent processes may be controlled more precisely. FIG. 7 shows different absolute switching thresholds T1, T2, T3, and T4 for each tooth-gap pair or gap-tooth pair. Storing the number of teeth/gaps is advantageous for implementing the algorithm for determining the position of teeth and tooth gaps. This may be achieved by programming the sensor prior to delivery to the customer.

Figure 8:
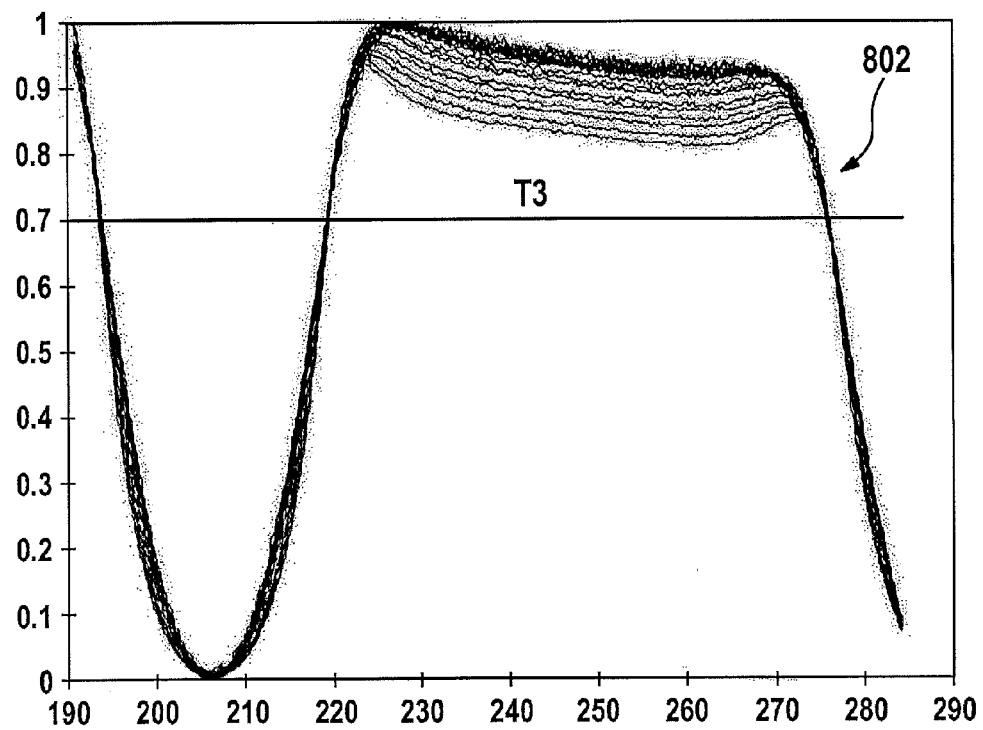
FIG. 8 shows an illustration of multiple normalized magnetic field strength curves of a sensor signal recorded in cyclical repetition as the function of a detection angle range, which may be used for carrying out the present invention.

FIG. 8 shows one example of an individual setting of a threshold value, in the present case threshold value T3, at an individual tooth from FIG. 7 according to one exemplary embodiment of the present invention. For this purpose, the tooth or the transition between a gap and a tooth, which is represented by a minimum level in the gap in front of the tooth up to a maximum level in the progression of the tooth, is depicted by a normalized relative magnetic flux from zero to one. Signal curves 802 have a point of minimum scattering width at 0.7 in the ascending signal edge. Individual threshold value T3 for tooth 3 is advantageously set at this point. The tooth may thus be detected at the same position over numerous revolutions of the sensor wheel.

For better illustration of the capability, FIG. 8 shows a normalized illustration of a signal curve for a tooth-gap pair. It is apparent that selecting individual switching threshold T3 to be 70% of the normalized signal amplitude in the present case provides very good results.

If it has been recognized in the preceding steps that the first and second transitions are present, with knowledge of the number of teeth and/or tooth gaps, for example, it may be determined which position the position sensor has assumed at that moment. For this purpose, for example, use may be made of the fact that certain teeth and/or gaps are situated at certain angles of the positions of the position sensor, so that the knowledge of which tooth and/or which tooth gap is directly in front of the sensor at that moment allows the instantaneous position of the position sensor to be deduced.

FIG. 9 shows a flow chart of a method for determining an individual switching threshold of teeth and/or tooth gaps of a position sensor as an algorithm description according to one exemplary embodiment of the present invention. At a start 902 of the method, a number n of teeth of a sensor wheel or a toothed rack used and a minimum threshold B@TPO are read out from a memory 904. For each of the teeth from 1 to n, the minimum threshold is loaded into an individual memory Z1_L1, Z2_L2, to Zn_Ln in a loading step 906. A difference between a tooth and a gap, or also between a gap and a tooth, is thus reliably recognized. The recognition accuracy within one to a few revolutions of the sensor wheel or movements of the toothed rack is improved in a fast learning algorithm 908 for tooth-gap (or also gap-tooth) Z1_L1 to Zn_Ln. A threshold value for a signal level which represents the tooth is adapted to an amplitude of the signal when a tooth is present at the sensor. This threshold value is stored for each tooth in memory Z1_L1, Z2_L2, to Zn_Ln. The threshold value may subsequently be improved over numerous (for example, more than 5) revolutions of the sensor wheel or movement cycles of the toothed rack in a slow learning algorithm 910 for tooth-gap (or also gap-tooth) Z1_L1 to Zn_Ln. The threshold value for each tooth is thus adapted based on a trend of the individual signal amplitude which represents the corresponding tooth over multiple past revolutions or movements. The improved threshold value is written into memory Z1_L1, Z2_L2, to Zn_Ln. As the result of an interruption of the method for various reasons, such as a restart of the method after a voltage drop or switching off of the sensor or the toothed rack, a reset 912 of the sensor and a restart 902 occur.

Thus, the sensor initially starts with the initial B@TPO switching threshold (i.e., initial threshold value), and for each tooth-gap pair (gap-tooth pair) then independently learns with respect to a new switching threshold. Accordingly, the B@TPO switching threshold (also referred to as the initial threshold value) is used as the first switching threshold for each tooth-gap pair, i.e., for the first revolution or movement. The learning algorithm itself is composed, for example, of a fast learning algorithm and a conservative learning algorithm in running mode. The former is advantageous for reaching the optimal switching threshold as quickly as possible, and the latter is advantageous for robustness against interferences. The same algorithm is used for each tooth-gap pair, but independently of one another. If a reset occurs, the sensor starts once again with reading in the number of teeth and the B@TPO switching threshold.

FIG. 10 shows one exemplary embodiment of a sensor wheel, having a numbering of the teeth and the gaps of the sensor wheel according to one exemplary embodiment of the present invention. A position of a sensor is marked by an arrow. A tooth is situated opposite from the sensor. When the method according to one exemplary embodiment starts, this tooth is denoted by Z1. When the sensor wheel turns away below the sensor and a first gap reaches the sensor, the first gap is denoted by L1. Together with first tooth Z1, this results in a first tooth-gap pair Z1_L1. When a second tooth reaches the sensor, the second tooth is denoted by Z2. Likewise, the second gap is denoted by L2. Second tooth Z2 and second gap L2 together result in second tooth-gap pair Z2_L2. A similar procedure is followed with the subsequent teeth and gaps until a prestored number of teeth and gaps of the sensor wheel have passed beneath the sensor. The sensor is then once again in front of tooth Z1. For each tooth-gap pair Z1_L1 to Zn_Ln, when there is a jump of a sensor signal from a high level to a low level and back again, a determination of an optimal threshold value T is carried out in order to determine in each case the exact point in time during the rotation when the tooth alternates with the gap. This occurs independently of runouts. Alternatively, a determination of the transition from a gap to a subsequent tooth in the direction of rotation or movement of the position sensor may be used. In this case, as described in detail above, the individual jumps from a gap to a tooth would be used for optimizing the threshold value or for determining a transition between a gap and a tooth.

FIG. 11 shows another exemplary embodiment of a sensor wheel having a different numbering of the teeth and the gaps of the sensor wheel according to one exemplary embodiment of the present invention. A position of a sensor is marked by an arrow. A gap is situated opposite from the sensor. When the method according to one exemplary embodiment starts, this gap is denoted by L1. When the sensor wheel turns away below the sensor and a first tooth reaches the sensor, the first tooth is denoted by Z1. Together with first gap L1, this results in a first gap-tooth pair L1_Z1. When a second gap reaches the sensor, the second gap is denoted by L2. Likewise, the second tooth is denoted by Z2. Second gap L2 and second tooth Z2 together result in second gap-tooth pair L2_Z2. A similar procedure is followed with the subsequent gaps and teeth until a prestored number of gaps and teeth of the sensor wheel have passed beneath the sensor. The sensor is then once again in front of gap L1. For each gap-tooth pair L1_Z1 to Ln_Zn, when there is a jump of a sensor signal from a low level to a high level and back again, a determination of an optimal threshold value T is carried out in each case in order to determine the exact point in time during the rotation when the gap alternates with the tooth. This occurs independently of runouts.

What is claimed is:

1. A method for determining a first and a second recognition threshold for recognizing a presence of teeth or tooth gaps of a position sensor in front of a sensor, the method comprising:

reading in a sensor signal which represents a variation over time of a measured magnetic field when the teeth and the tooth gaps of the position sensor are passed by the sensor;

ascertaining from the sensor signal a first value based on a minimum value of the sensor signal and a first value based on a maximum value of the sensor signal within a predefined time interval;

computing a first differential absolute value which represents a predetermined percentage of a difference between the first value based on the maximum value of the sensor signal and the first value based on the minimum value of the sensor signal;

determining a first recognition threshold, so that the first recognition threshold represents a value that corresponds to a result of adding the first differential absolute value to the first value based on the minimum value of the sensor signal;

ascertaining from the sensor signal a second value based on a minimum value of the sensor signal and a second value based on a maximum value of the sensor signal within a second predefined time interval subsequent to the predefined time interval;

computing a second differential absolute value which represents a second predetermined percentage of a difference between the second value based on the maximum value and the second value based on the minimum value of the sensor signal; and determining a second recognition threshold, which is different from the first recognition threshold, so that the second recognition threshold represents a value that corresponds to a result of adding the second differential absolute value to the second value based on the minimum value of the sensor signal, wherein the method provides for precise determination of a position of the teeth or the gaps of the position sensor.

2. The method as recited in claim 1, wherein in the computing of the second differential absolute value, a value is used which corresponds to the predetermined percentage that is used in the step of computing the first differential absolute value.

3. The method as recited in claim 1, wherein in ascertaining of the first value step, at least one of the first value based on the minimum value of the sensor signal, and the first value based on the maximum value of the sensor signal, is discarded if a difference between the first value based on the minimum value and the first value based on the maximum value is less than a predetermined differential threshold value.

4. The method as recited in claim 1, wherein in ascertaining of the second value step, at least one of the second value based on the minimum value of the sensor signal, and the second value based on the maximum value of the sensor signal, is discarded if a difference between the second value based on the minimum value and the second value based on the maximum value is less than a predetermined differential threshold value.

5. The method as recited in claim 1, wherein a position sensor having a number of n teeth in combination with the sensor is used, and wherein in the reading-in, a sensor signal having a plurality of groups of small values and a plurality of groups of large values is read in, and in the ascertaining the first value, the first value based on a minimum value of the sensor signal is obtained by averaging minimum values of each nth group of small values, and the first value based on a maximum value of the sensor signal is obtained by averaging the maximum values of each nth group of large values.

6. The method as recited in claim 1, wherein after the determining, detecting a tooth of the position sensor when the sensor signal has a value that is greater than the one of the first recognition threshold or the second recognition threshold.

7. A device for determining a recognition threshold for recognizing a presence of a tooth or a tooth gap of a position sensor in front of a sensor, the device comprising:

an interface to read in a sensor signal which represents a variation over time of a measured magnetic field when the teeth and the tooth gaps of the position sensor are passed by the sensor;

a unit to ascertain from the sensor signal a first value based on a minimum value of the sensor signal and a first value based on a maximum value of the sensor signal within a predefined time interval, and to ascertain from the sensor signal a second value based on a minimum value of the sensor signal and a second value based on a maximum value of the sensor signal within a second predefined time interval subsequent to the predefined time interval;

a unit to compute a first differential absolute value which represents a predetermined percentage of a difference between the first value based on the maximum value and the first value based on the minimum value of the sensor signal, and to compute a second differential absolute value which represents a second predetermined percentage of a difference between the second value based on the maximum value and the second value based on the minimum value of the sensor signal; and a unit to determine the recognition threshold, so that the recognition threshold represents a value that corresponds to a result of adding the first differential absolute value to the first value based on the minimum value of the sensor signal, and to determine a second recognition threshold, which is different from the first recognition threshold, so that the second recognition threshold represents a value that corresponds to a result of adding the second differential absolute value to the second value based on the minimum value of the sensor signal, wherein the device is configured to provide for precise determination of a position of the teeth or the tooth gaps of the position sensor.

8. A non-transitory computer-readable storage medium storing program code to determine a first and a second recognition threshold for recognizing a present of teeth or tooth gaps of a position sensor in front of a sensor, the program code, when executed by a device, causing the device to perform:

reading in a sensor signal which represents a variation over time of a measured magnetic field when the teeth and the tooth gaps of the position sensor are passed by the sensor;

ascertaining from the sensor signal a first value based on a minimum value of the sensor signal and a first value based on a maximum value of the sensor signal within a predefined time interval;

computing a first differential absolute value which represents a predetermined percentage of a difference between the first value based on the maximum value of the sensor signal and the first value based on the at least one minimum value of the sensor signal;

determining a first recognition threshold, so that the first recognition threshold represents a value that corresponds to a result of adding the first differential absolute value to the first value based on the minimum value of the sensor signal;

ascertaining from the sensor signal a second value based on a minimum value of the sensor signal and a second value based on a maximum value of the sensor signal within a second predefined time interval subsequent to the predefined time interval;

computing a second differential absolute value which represents a second predetermined percentage of a difference between the second value based on the maximum value and the second value based on the minimum value of the sensor signal; and determining a second recognition threshold, which is different from the first recognition threshold, so that the second recognition threshold represents a value that corresponds to a result of adding the second differential absolute value to the second value based on the minimum value of the sensor signal.

wherein the method provides for precise determination of a position of the teeth or the tooth gaps of the position sensor.

* * * * *